United States Patent [19]

Chapman et al.

[11] 4,279,782

[45] Jul. 21, 1981

[54] APPLICATION OF AN ALUMINA COATING TO OXIDE WHISKER-COVERED SURFACE ON AL-CONTAINING STAINLESS STEEL FOIL

[75] Inventors: Lloyd R. Chapman, St. Clair Shores; John F. Watton, Mt. Clemens, both of Mich.

[73] Assignee: General Motors Corporation, Detroit, Mich.

[21] Appl. No.: 135,484

[22] Filed: Mar. 31, 1980

[51] Int. Cl.$^3$ .................. B01J 21/04; B01J 23/86
[52] U.S. Cl. ............................. 252/465; 252/463; 252/477 R; 423/213.5
[58] Field of Search ............ 252/463, 465, 477 R; 148/6.27

[56] References Cited

U.S. PATENT DOCUMENTS

| | | | |
|---|---|---|---|
| 3,957,692 | 5/1976 | Cairns et al. | 252/465 |
| 4,096,095 | 6/1978 | Cairns | 252/465 |
| 4,196,099 | 4/1980 | Hunter et al. | 252/477 R |

*Primary Examiner*—W. J. Shine
*Attorney, Agent, or Firm*—Douglas D. Fekete

[57] ABSTRACT

In a preferred embodiment, a method is disclosed for applying a gamma alumina coating to a metal foil composed of an aluminum-containing ferritic stainless steel alloy and having an oxidized surface that is substantially covered by high-aspect alumina whiskers. The method comprises wetting the whisker-covered surface with a thixotropic alumina gel formed by mixing between about 4% to 6% by weight alumina monohydrate in water and acidifying with nitric acid to a pH below 2.0. While still wet, the primed surface is coated with a material consisting of gamma alumina powder suspended in a similar acid-stabilized aqueous alumina gel. The two-coat layer is air-dried and additional layers of the powder-containing material are applied and dried to form a gamma alumina coating of desired thickness.

4 Claims, 2 Drawing Figures

APPLICATION OF AN ALUMINA COATING TO OXIDE WHISKER-COVERED SURFACE ON AL-CONTAINING STAINLESS STEEL FOIL

BACKGROUND OF THE INVENTION

This invention relates to the manufacture of an automotive catalytic converter comprising wound Fe-Cr-Al or Fe-Cr-Al-Y foil having an oxidized surface covered with densely spaced oxide whiskers and carrying a catalyst-impregnated alumina coating. More particularly, this invention relates to an improved method for applying gamma alumina powder suspended in an alumina gel to an alumina whisker-covered surface on oxidized metal foil to form a tightly adherent gamma alumina coating, suitable for supporting a catalyst.

U.S. patent application Ser. No. 098,075 filed Nov. 28, 1979, of common assignee-ownership, for which we and Charles W. Vigor are joint inventors, describes the manufacture of a monolith-type catalytic converter for treating automotive exhaust gases. The converter comprises corrugated metal foil suitably wound to form a structure having gas-conveying passages. The preferred foil is fabricated by a metal peeling process of a high-temperature, corrosion-resistant ferritic stainless steel alloy containing, by weight, 15 to 25% chromium (Cr); 3 to 6% aluminum (Al); optionally 0.3 to 1.0% yttrium (Y); and the balance iron (Fe). When the peeled alloy foil is heated in air under suitable conditions, densely spaced alumina whiskers grow on the surface, in marked contrast to conventional flat oxides. Although the whisker-covered surface exhibits at least a twelve-fold increase in surface area in comparison to the substrate geometric surface area (or the flat oxide), the whiskers do not provide a sufficient density of catalyst sites to optimize the converter efficiency per unit volume. Consequently, the oxidized foil surface is coated with a gamma alumina material capable of providing a 4,000× increase in surface area. The coating material comprises gamma alumina powder dispersed in an aqueous alumina gel that, upon drying, binds the powder into a cohesive layer suitable for supporting a noble metal catalyst. In addition to providing a high density of catalyst sites, the gamma alumina coating also prolongs the converter lifetime by reducing the detrimental effects of lead and some other exhaust gas constituents.

One problem generally encountered in wound foil converters concerns spalling of the catalyst-bearing gamma alumina coating. Spalling is fundamentally related to poor bonding between the applied alumina coating and the oxidized foil surface. Although the whiskers appear to provide a better base for gripping the coating than flat oxides, the desired spall resistance was not achieved when the powder-containing gel was sprayed directly onto the whiskered surface.

Therefore, it is an object of this invention to provide an improved method for applying a coating material comprising ceramic powder dispersed in an aqueous alumina gel onto an oxide whisker-covered surface to form a tightly adherent ceramic layer.

It is a more particular object of this invention to provide a method for coating a metal foil surface that is substantially covered with alumina whiskers with a spall-resistant gamma alumina layer applied as a dispersion of gamma alumina powder in an aqueous alumina gel. The method comprises priming the whisker-covered surface prior to applying the dispersed gamma alumina powder to strengthen the bonding between the whiskers and the layer without adversely affecting the high surface area and other properties of the gamma alumina. Thus, a metal foil carrying a gamma alumina coating is provided that is suitable for bearing a noble metal catalyst and thereby for forming a catalytic converter for treating automotive exhaust gases.

BRIEF SUMMARY OF THE INVENTION

In the preferred embodiment, these and other objects are accomplished by wetting an alumina whisker-covered foil surface with an alumina gel to prime the surface to receive a coating material comprising gamma alumina powder dispersed in a substantially similar alumina gel. The preferred gel prime is prepared by adding between about 4 to 6% by weight colloidal alpha alumina monohydrate ($Al_2O_3.H_2O$) to water and acidifying the mixture by adding nitric acid ($HNO_3$) to adjust the pH to below 2.0. The resultant thixotropic gel is sprayed onto the whiskers as thick as possible without dripping or running. A gamma alumina material is then sprayed onto the primed surface while still wet. The preferred gamma alumina material comprises nine (9) parts high-porosity, high-surface-area, macroscopic gamma alumina powder, and about one (1) part alumina in the gel vehicle. The gel vehicle is also preferably an acid-stabilized water-base mixture prepared from colloidal alumina monohydrate similar to the gel prime but at a slightly lower alumina compound content of about 4% by weight, or less. The two-coat film is air-dried and additional coats of the gamma alumina material are applied and dried, without further priming, until the accumulated gamma alumina coating is about 40 to 50 microns thick. The coated foil is then calcined for about four hours at about 550° C. in air, during which the nitric acid in the alumina gel decomposes. The product coating layer is substantially composed of the gamma alumina and is tightly bonded to the whiskered surface to resist spalling.

Thus, this method combines the advantages of a whisker topography and a two-step coating method to produce a metal foil carrying a gamma alumina coating with improved adhesion. The gel alone is first applied and penetrates the dense whiskers that have been integrally grown on the foil surface. When the powder dispersion is applied, the gel vehicle flows into the gel prime and thereby forms a continuous alumina gel matrix extending from the whiskered surface about the gamma alumina particles. During drying the prime provides additional alumina bonding agent at the sites most needed, between the whisker and the powder. In addition, shrinkage of the predominately water gel matrix during drying draws the particles into the whisker array. The result is a stronger particle-to-whisker bond which is produced without diluting the gamma alumina material. Also, the alumina matrix cohesively bonds the powder particles into the suitably strong coating. The high-solids material produces the desired high surface area and dense population of catalyst sites in the coating. Thus, in the preferred embodiment, the resultant tightly adherent gamma alumina coating is suitable for impregnation with a noble metal catalyst and for use in the manufacture of an automotive catalytic converter to substantially prolong the useful lifetime by resisting high-temperature spalling.

DETAILED DESCRIPTION OF THE INVENTION

In the preferred embodiment, an automotive catalytic converter is formed by applying a tightly adherent gamma alumina coating to a whisker-covered, peeled Fe-Cr-Al-Y foil using the gel prime of this invention. The preferred foil is composed of an alloy consisting of by weight: 15% chromium, 4% aluminum, 0.5% yttrium, and the balance iron. The alloy is commercially available under the trade designation Fecralloy. The foil is peeled from a rotating cylindrical billet by feeding a durable tungsten carbide cutting tool into the peripheral surface to continuously peel therefrom a thin metal strip. The strip is pulled away from the billet surface under controlled tension to form the desired foil. The foil thickness is determined by several factors including the peripheral surface speed, the cutting tool feed rate, and the tension applied to the strip. Of particular significance here, the foil features an irregular and severely worked surface which is preferred for growing dense alumina whiskers.

Before growing the whiskers, the foil is solvent-cleaned particularly to remove cooling fluid applied to the metal during during peeling. The cleansed foil is annealed for one minute at 900° C. in air. Annealing renders the foil more readily workable but does not inhibit whisker growth. The annealed foil is corrugated by passing it between a pair of driven rollers carrying mating teeth arranged in a zigzag pattern to form a zigzag or herringbone corrugation pattern in the foil. Any lubricant applied to aid corrugation is cleaned away using a solvent such as tetrafluoroethylene. The corrugated foil is wound into the desired converter structure by bending the strip in half, crest-to-crest, so that the corrugations do not mate, but instead form open passages. The bent foil is coiled in a similar manner without mating the corrugations to form a generally cylindrical structure. The wound structure is substantially the shape of the product catalytic converter structure. The remaining processing steps are adapted to treat the foil surface. Coiling is preferably carried out before surface treatment to permit easier handling of the foil. During subsequent treatment, the foil may be either loosely wound to avoid metal-to-metal contact, particularly during furnace heating, or uncoiled and recoiled to provide access to the foil surface, particularly during coating operations.

Figure 1:
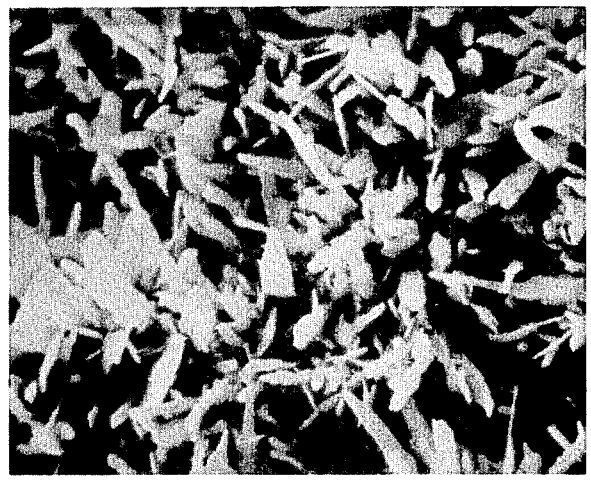
FIG. 1 is a photomicrograph taken at 5000× magnification using a scanning electron microscope and showing the oxide whiskers formed on the compressive surface of peeled Fe-Cr-Al-Y foil oxidized for twenty-four hours at 900° C. in air. The compressive surface is formed remote from the cutting tool during a metal peeling operation.
Figure 2:
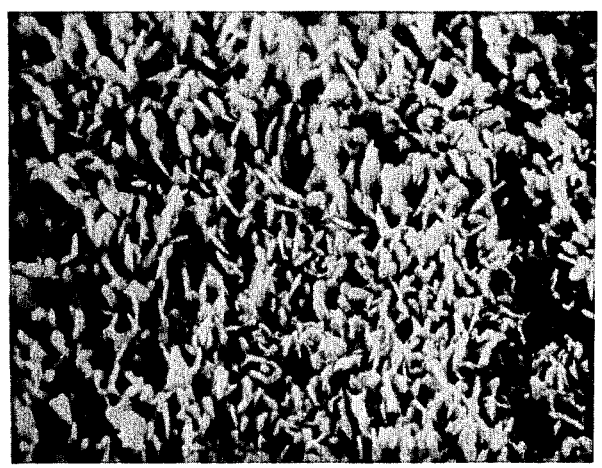
FIG. 2 is a similar photomicrograph showing the oxide whiskers formed on the opposite tensive surface of the peeled Fe-Cr-Al-Y foil in FIG. 1.

The oxide whiskers are grown by heating the foil for twenty-four hours at 900° C. in a furnace having a circulating air atmosphere. FIG. 1 shows the preferred whiskers grown on the compressive foil surface, that is, the foil surface formed away from the cutting tool during peeling. FIG. 2 shows the whiskers grown on the opposite or tensive foil surface which is formed against the cutting tool and grows generally larger individual blades. As seen in the Figures, both surfaces are substantially covered with high-aspect whiskers, i.e., whiskers having a large height-to-width ratio.

The whisker-covered surface is, in turn, covered with a gamma alumina coating applied with the alumina gel prime, in accordance with this invention. The gel for the prime coat is formed by mixing 5.0 parts by weight colloidal alpha alumina monohydrate ($Al_2O_3.H_2O$) with 95 parts deionized water. The resultant physical mixture of alumina particles in water is stabilized by adding concentrated nitric acid ($HNO_3$) to lower the pH below about 2.0, as determined by the ability of the gel to turn commercial pH 2-14 indicating paper bright red. About 5 parts nitric acid is generally sufficient. The nitric acid addition causes the alumina to lose its alpha identity and produces a thixotropic gel that is substantially clear and colorless.

A similar gel of lower alumina content is prepared for use as the vehicle for applying the gamma alumina powder. The preferred vehicle gel comprises 3.0 parts by weight colloidal alpha alumina monohydrate in 97 parts water and is also nitric acid-stabilized below a pH of 2.0. The lower alumina content results in a less viscous gel that forms a more sprayable mixture with the gamma alumina powder. The gamma alumina powder preferably has a porosity greater than about 1 cc pores per gram and a surface area greater than about 100 square meters per gram. About 70% of the particles are sized less than 200 mesh and greater than 325 mesh, and the balance are smaller than 325 mesh. The preferred coating material is prepared by uniformly mixing 27 parts by weight of gamma alumina particles to about 100 parts gel. Thus, the alumina in the coating material is about 90% by weight gamma alumina and 10% by weight gel-derived alumina. Although the colloidal alumina loses its alpha character in the gel, the gamma alumina survive as discrete particles when physically dispersed in the gel and retain their gamma character, including the desired high surface area. After mixing, the particles remain suspended in the gel to form the stable, white, coating material, which has a high viscosity, due primarily to its high solids content.

The foil surface is coated by spraying with an air-aspirated sprayer having a gravity feed. A prime coat of the aforementioned alumina gel is first sprayed onto the whisker-covered surface as thick as possible without running or dripping. Before the prime coat dries, a first coat of the particle-containing gel is spray-applied. The two-coat film is air-dried until turning white using a hot air blower. The dried film is preferably about 15 microns thick. Two to five additional coats of the particle-containing material are similarly spray-applied and air-dried to produce a total gamma alumina coating between 40 to 50 microns thick. Each additional coat is applied directly over the previous dried coat, without an intermediate gel coat like the prime coat. The air-dried multicoat layer is calcined for four hours at 550° C. in air. During calcining, noxious $NO_2$ fumes are driven off and a tightly adherent coating that is substantially gamma alumina is formed.

The product gamma alumina coating is suitably impregnated with the noble metal catalyst. A catalyst-containing solution is prepared by dissolving predetermined amounts of tetraamineplatinum(II) chloride, tetraaminepaladium(II) chloride, and pentaaminerhodium-(III) chloride in water. The solution is applied evenly over the foil by passing the uncoiled foil between sponge pads onto which the noble metal solution is metered at a predetermined rate to provide the desired amount of metal per structure. The wet coating is dried with a hot air blower and calcined for four hours at 550° C. in an atmosphere consisting of 4% by volume hydrogen and 96% nitrogen. Calcining destroys the amine complex salts and reduces the noble metals to their elemental and catalytically active states.

The wound foil structure carrying the catalyst-impregnated gamma alumina coating is suitable for exhaust gas treatment. The tightly coiled structure is arranged within a suitable housing that is part of the automotive exhaust system. The exhaust gases flowing through the zigzag passages are brought into contact with the noble metals to undergo the desired reactions that reduce the amounts of carbon monoxide, hydrocarbons, and nitrogen oxides in the emitted gases.

In the preferred embodiment, densely spaced alumina whiskers substantially covering the foil surface are readily grown on foil produced by metal peeling. In contrast, clean cold-rolled foil that is similarly oxidized forms only occasional whiskers. It has been found that the desired dense whisker topography is produced on cold-rolled foil by suitably treating the foil prior to oxidation. One pretreatment calls for applying to the foil a thin layer of a suitable heavy oil composition, such as Mobil D.T.E. Oil, and heating without flashing at about 300° C. until vaporizing ceases, leaving a black residue. Suitable residues are alternately formed using graphite powder dispersed in a light oil instead of the heavy oil. Another pretreatment comprises heating the clean foil for about one minute at 900° to 925° C. in a predominately argon atmosphere having a trace oxygen content sufficient to barely oxidize the the surface to a dull grey or off-silver tint. It is estimated suitable atmospheres contain about 0.1% oxygen, typically from air leaked into the furnace. After either pretreatment, the foil is oxidized under conditions equivalent to the preferred peeled foil to grow densely spaced whiskers that substantially cover the foil surface, similar to the whisker topography shown in FIG. 2.

The preferred foil is composed of an aluminum-containing ferritic stainless steel alloy. Suitable iron alloys contain by weight 15% to 25% chromium and 3% to 6% by weight aluminum. Alloys also containing 0.3% to 1.0% by weight yttrium exhibit improved high-temperature corrosion resistance and are therefore preferred. The presence of yttrium improves the adhesion of the whiskers to the alloy and thus of the coating to the foil.

The oxidation temperature and time required for whisker growth are related to the alloy composition. For Fe-Cr-Al-Y alloys, high-aspect alumina whiskers are suitably grown by heating in air between about 870° C. and 930° C. for greater than about eight hours. No whisker growth is observed at temperatures greater than about 950° C. For Y-free Fe-Cr-Al alloys, good whisker growth is obtained between about 870° C. and about 970° C. Oxidation times depend upon the temperature: at least four hours are required at about 950° C., while at least twenty-four hours are necessary at temperatures near 870° C. In general, for all alloys, acceptable whiskers are formed after eight hours at 930° C. in air.

The preferred gel for the primer contained about 4% to about 6% by weight alumina monohydrate compound, which corresponds to about 3.4% to 5.1% by weight alumina. Below 4% compound, the gel is too thin and tends to run when sprayed onto the whiskered surface. Primer coats of the watery gel do not develop the desired spall-resistance. Above about 6% by weight compound, the gel becomes too viscous to be conveniently sprayed or to penetrate the whiskers as desired. The alumina-water mixture is preferably gelled by adding nitric acid which decomposes during subsequent calcining operations to form gaseous products that escape into the atmosphere, thereby producing an uncontaminated alumina coating. Gelling is also effected by adding other mineral acids or acetic acid. Concentrated acids are preferred to minimize the necessary volume of acid addition. The pH of the preferred nitric acid-stabilized gel has been found to be less than 2.0. The alumina-water mixture may also be gelled by adding an alkaline solution to adjust the pH above 8.

The preferred gamma alumina powder is applied in mixture with a similar alumina gel. As used herein, the powder is composed of macroscopic particles, in contrast to the microscopic alumina particles that theoretically form the gel. A high powder content in the coating material is preferred to produce the desired high surface area of the finished gamma coating. Although the gel-derived alumina is believed to also form predominately gamma phase in the coating, it does not exhibit the high surface area of the powdered material. To achieve the preferred surface area, the weight ratio of the macroscopic gamma alumina particles to alumina gel is preferably greater than about 8.5:1. Ratios greater than 9.5:1 typically contain an insufficient alumina binder to develop adequate cohesive strength. Suitable gel vehicles contain between about 1% to 4% by weight alumina monohydrate compound, with less than 4% by weight being preferred. Gel concentrations of less than about 1% by weight generally produce insufficient bonding to hold the particles together. Gels formed with greater than about 4% by weight alumina monohydrate cannot be conveniently sprayed when mixed with the powder. In addition, the materials may be suitably applied by means other than spraying, such as dipping or brushing.

Applying the coating material directly onto the unprimed whiskers produces a weakly bonded coating that readily spalls. The high-solids material is evidently too viscous to penetrate into the whisker array and thus dries without bonding to the whiskers. Diluting the coating material reduces its viscosity but also necessarily reduces the surface area of the product coating. In contrast, a gel film applied in accordance with this invention flows together with the subsequently applied gel vehicle to form a gel matrix engulfing the gamma alumina particles and thoroughly contacting the whiskers. Drying causes the gel material (which is predominately water) to shrink and thereby draws the gamma alumina particles into the whisker array. The primer also delivers additional alumina to the regions between the particles and the whiskers to strengthen the resultant bond. The product coating adheres strongly to the whisker-covered surface.

Although the high-surface area gamma alumina coating is preferred for catalytic converter use, it is apparent that coatings may be suitably produced by substituting zirconia powder or powder composed of an alumina other than gamma, such as theta or delta. In general, the two-step coating method of this invention is readily adaptable to produce coatings of ceramic powders or mixtures of ceramic powders that are suitably suspended in the gel and cohesively bonded by alumina. Although the spall-resistant coated foil may be adapted for any suitable purpose, in the preferred embodiment a catalyst-containing solution was applied to the gamma alumina coating. Other methods are available for catalytically impregnating the coating, such as dissolving the noble metal salts into the gel vehicle, or impregnating the gamma alumina particles prior to dispersion into the gel vehicle.

Although this invention has been described in terms of certain embodiments thereof, it is not intended to be limited to the above description, but rather only to the extent set forth in the claims that follow.

The embodiments of the invention for which an exclusive property or privilege is claimed are defined in the following claims:

1. A method of coating a surface comprising closely spaced oxide whiskers with an adherent ceramic layer, said method comprising:
   wetting the whisker covered surface with an aqueous alumina gel, said gel penetrating between the whiskers; and
   applying to the still-wet surface a material comprising macroscopic ceramic particles suspended in an aqueous alumina gel, said gels combining to form a continuous alumina gel matrix about said particles and said whiskers that, upon drying and firing, bonds said particles to said whisker surface with improved adhesion.

2. A method of coating a surface that is substantially covered with closely spaced oxide whiskers with an adherent ceramic layer, said method comprising:
   wetting the whisker-covered surface with a low-viscosity aqueous alumina gel, said gel penetrating between the whiskers;
   coating the gel-wetted surface with a high-viscosity material consisting of macroscopic gamma alumina particles suspended in an aqueous alumina gel capable of flowing together with the first applied low-viscosity gel to form a continuous matrix about said particles and said whiskers; and
   drying and firing the coated surface to tightly bond said particles to said whisker-covered surface.

3. A method for coating a metal foil of an aluminum-containing ferritic stainless steel alloy with a tightly adherent, high-surface area gamma alumina coating, said method comprising:
   growing on the foil surface densely spaced, high-aspect alumina whiskers that substantially cover the surface;
   wetting the whisker-covered surface with an alumina gel comprising a nitric acid-stabilized mixture of about 4% to 6% by weight alumina monohydrate in water, said gel being applied by spray and penetrating between said whiskers;
   spray-coating the still-wet surface with a material comprising macroscopic gamma alumina powder having a high-surface area and suspended in an alumina gel vehicle of similar nitric acid-stabilized aqueous composition to the surface-wetting gel except comprising about 4% by weight or less alumina monohydrate, said material having a gamma alumina to gel alumina weight ratio between about 8.5:1 to 9.5:1, said applied gels flowing together to form a continuous matrix about the powder and the whiskers; and
   drying and calcining the gel matrix to form a predominately gamma alumina coating that is tightly bonded to the foil and exhibits the desired high surface area.

4. A method for coating a metal foil of an aluminum-containing ferritic stainless steel and having a foil surface that is substantially covered with densely spaced oxide whiskers, said method comprising:
   wetting the whisker covered surface with an aqueous alumina gel, said gel penetrating between the whiskers; and
   applying to the still-wet surface a material comprising macroscopic ceramic particles suspended in an aqueous alumina gel, said gels combining to form a continuous alumina gel matrix about said particles and said whiskers that, upon drying and firing, bonds said particles to said whisker surface with improved adhesion.

* * * * *